(12) United States Patent
Ohmura et al.

(10) Patent No.: US 7,923,145 B2
(45) Date of Patent: Apr. 12, 2011

(54) SURFACE TREATED STEEL SHEET FOR BATTERY CASE, BATTERY CASE AND BATTERY USING THE CASE

(75) Inventors: Hitoshi Ohmura, Kudamatsu (JP);
Tatsuo Tomomori, Kudamatsu (JP);
Yoshitaka Honda, Kudamatsu (JP)

(73) Assignee: Toyo Kohan Co., Ltd., Tokyo (JP)

( * ) Notice: Subject to any disclaimer, the term of this patent is extended or adjusted under 35 U.S.C. 154(b) by 1063 days.

(21) Appl. No.: 10/511,844

(22) PCT Filed: Apr. 17, 2003

(86) PCT No.: PCT/JP03/04869
§ 371 (c)(1),
(2), (4) Date: Oct. 19, 2004

(87) PCT Pub. No.: WO03/098718
PCT Pub. Date: Nov. 27, 2003

(65) Prior Publication Data
US 2005/0089752 A1    Apr. 28, 2005

(30) Foreign Application Priority Data
Apr. 22, 2002  (JP) .................................. 2002-119679

(51) Int. Cl.
*H01M 2/04*  (2006.01)
*H01M 2/00*  (2006.01)
*B32B 15/18*  (2006.01)

(52) U.S. Cl. ......... 429/176; 429/163; 428/679; 428/684

(58) Field of Classification Search .................. 429/176; 428/679, 684, 687
See application file for complete search history.

(56) References Cited

U.S. PATENT DOCUMENTS

| | | | | |
|---|---|---|---|---|
| 3,355,267 A | * | 11/1967 | Du Rose | 428/639 |
| 5,576,113 A | * | 11/1996 | Hirofumi et al. | 428/679 |
| 5,993,994 A | * | 11/1999 | Ohmura et al. | 429/176 |
| 6,153,027 A | * | 11/2000 | Sugikawa | 148/516 |
| 6,692,869 B1 | | 2/2004 | Ohmura et al. | |
| 6,979,515 B2 | * | 12/2005 | Ohmura et al. | 429/163 |
| 7,150,939 B2 | * | 12/2006 | Ohmura et al. | 429/176 |

FOREIGN PATENT DOCUMENTS

| | | | |
|---|---|---|---|
| EP | 1103638 A1 | | 5/2001 |
| JP | 02129395 A | * | 5/1990 |
| JP | 7-99686 B | | 4/1995 |
| WO | WO 95/11527 | | 4/1995 |
| WO | WO 00/05437 | * | 2/2000 |

OTHER PUBLICATIONS

M.M. Younan et al., "Effect of heat treatment on electroless ternary nickel-cobalt-phosphorus alloy", Journal of Applied Electrochemistry, 32: 439-446, 2002.*
Kiyokazu, I. et al., "Ni Plated Steel Sheet for Positive Electrode Can of Alkali Manganese Battery Having Excellent Battery Characteristic, and Production Method Therefor", JP 2002-212778 A, abstract.
Hitoshi, O. et al., "Surface-Treated Steel Plate for Battery Case, and Battery Case", JP 2002-155394 A, abstract.
Hitoshi, O. et al., "Surface Treatment Steel Plate for Battery Case and Battery Case", JP 2002-50324 A, abstract.
Masaki, I. et al., "Electrical Contact Material and Its Production Method", JP 2001-279489 A, abstract.
WO 00/65672 A, claims.
WO 00/65671 A, claims.
Hirofumi, S. "Battery Can Forming Material, Battery Can Forming Method and Battery Can", JP 9-306439 A, abstract.
Hirofumi, S. "Battery Can Forming Material, Manufacture of This Material and Battery Can Formed by Using This Battery Can Forming Material", JP 9-306438 A, abstract.
WO 97/42668 A1, claims.
Hitoshi, O. et al., "Flaw Resistant Nickel-Plated Steel Sheet and Production Thereof", JP 2-129395 A, abstract.

* cited by examiner

*Primary Examiner* — Dah-Wei D Yuan
*Assistant Examiner* — Edu E Enin-Okut
(74) *Attorney, Agent, or Firm* — Browdy and Neimark, PLLC

(57) ABSTRACT

A surface treated steel sheet for a battery case, which has a diffusion layer of a nickel-phosphorus alloy or a nickel-cobalt-phosphorus alloy formed on the outermost layer of the inside surface of a plated steel sheet for a battery case; a battery case which is produced through forming the surface-treated steel sheet having a diffusion layer of a nickel-phosphorus alloy or a nickel-cobalt-phosphorus alloy by the deep drawing method, the DI forming or the DTR forming: and a battery using the battery case. The battery case can be used for producing a battery excellent in battery characteristics.

3 Claims, No Drawings

SURFACE TREATED STEEL SHEET FOR BATTERY CASE, BATTERY CASE AND BATTERY USING THE CASE

TECHNICAL FIELD

The present invention concerns a surface treated steel sheet for battery case, a battery case and a battery using the case.

BACKGROUND ART

Heretofore, in battery cases for sealing strongly alkaline solutions of alkali-manganese batteries as primary batteries or nickel-cadmium batteries as secondary batteries and, further, nickel hydrogen batteries for which growth of demand has been expected in recent years as new secondary batteries, a so-called post-plating method of applying barrel plating after pressing cold rolled steel sheets, or a so-called pre-plating method of pressing a nickel plated steel sheets into a battery case have been adopted, for which many proposals have been made for the improvement and the present inventors have also proposed an excellent surface treated steel sheet for battery cases with low internal resistance (International Publication No. WO95/11527).

Further, in recent years, as a press forming method for battery cases, a DI (drawing and ironing) forming method has also been used as a wall thinning method instead of a multi-stage deep drawing method for increasing the battery capacity (JP-B No. 7-99686). The DI forming method or DTR (drawing thin and redraw) forming method can fill more positive electrode and negative electrode active substances by as much as the additional volume created by the side wall being thinner than the bottom, to increase the capacity of the battery, as well as also provide a merit capable of improving the pressure proofness of the battery since the case bottom is thick.

By the way, while the DI forming method or the DTR forming method is a forming method effective to the increase of the battery capacity as described above, since the deformation resistance of a material is larger compared that with the existent multi-stage deep draw forming method in view of the forming ability, it involves a disadvantage with respect to the continuous forming property.

Further, it has been required for alkali-manganese batteries in recent years that they are excellent in performance such as internal resistance, short circuit current and discharge characteristics.

A battery case manufactured by a deep draw forming method, DI forming method or DTR forming method comprises a nickel layer or an iron-nickel layer as the surface layer on the inner surface but has a limit in view of the battery performance and improvement has been demanded.

The present invention has a technical subject of providing a battery case excellent in the battery performance and a surface treated steel sheet that can be used suitably to the manufacture of the battery case.

DISCLOSURE OF THE INVENTION

Then, the present inventors have found that when a battery case manufactured by a deep draw forming method, a DI forming method or a DTR forming method has a heat treated phosphorus containing diffusion layer at the surface layer on the inner surface of a can, it is excellent in battery performance such as internal resistance or short-circuit current.

A surface treated steel sheet for a battery case according to an embodiment is characterized in that a diffusion layer of a nickel-phosphorus alloy is formed at a surface on the inner side of the battery case.

A surface treated steel sheet for a battery case according to an embodiment is characterized in that an iron-nickel diffusion layer is formed as a lower layer and a diffusion layer of a nickel-phosphorus alloy is formed as an upper layer at a surface on the inner side, and an iron-nickel diffusion layer is formed as a lower layer and a nickel layer is formed as an upper layer at a surface on the outer side of the battery case.

A surface treated steel sheet for a battery case according to an embodiment is characterized in that an iron-nickel diffusion layer is formed as a lower layer, a nickel layer is formed as an intermediate layer and a diffusion layer of a nickel-phosphorus alloy is formed as an upper layer at a surface on the inner side, and an iron-nickel diffusion layer is formed as a lower layer and a nickel layer is formed as an upper layer at a surface on the outer side of the battery case. The diffusion layer of the nickel-phosphorus alloy preferably contains $Ni_3P$. Further, the thickness of the nickel-phosphorus alloy is preferably within a range from 0.1 to 2 μm. Further, it is preferred that the phosphorus content of the nickel-phosphorus alloy is within a range from 1 to 12% by weight.

A surface treated steel sheet for a battery case according to an embodiment is characterized in that a diffusion layer of a nickel-cobalt-phosphorus alloy is formed at a surface on the inner face side of the battery case.

A surface treated steel sheet for a battery case according to an embodiment is characterized in that an iron-nickel diffusion layer is formed as a lower layer and a diffusion layer of a nickel-cobalt-phosphorus alloy is formed as an upper layer at a surface on the inner side, and an iron-nickel diffusion layer is formed as a lower layer and a nickel layer is formed as an upper layer at a surface on the outer side of the battery case.

A surface treated steel sheet for a battery case according to an embodiment is characterized in that an iron-nickel diffusion layer is formed as a lower layer, a nickel layer is formed as an intermediate layer, and a diffusion layer of a nickel-cobalt-phosphorus alloy is formed as an upper layer at the surface on the inner side, and an iron-nickel diffusion layer is formed as a lower layer and a nickel layer is formed as an upper layer at the surface on the outer side of the battery case. The thickness of the nickel-cobalt-phosphorus alloy is preferably within a range from 0.1 to 2 μm. Further, the nickel-cobalt-phosphorus alloy preferably has a cobalt content in a range of from 5 to 30% by weight, and a phosphorus content in a range of from 1 to 12% by weight.

A battery case according to an embodiment is characterized in that a diffusion layer of a nickel-phosphorus alloy is formed on the inner surface.

A battery case according to an embodiment is characterized in that an iron-nickel diffusion layer is formed as a lower layer and a nickel-phosphorus alloy layer is formed as an upper layer at the inner surface, and an iron-nickel diffusion layer is formed as a lower layer and a nickel layer is formed as an upper layer at the outer surface thereof.

A battery case according to an embodiment is characterized in that an iron-nickel diffusion layer is formed as a lower layer, a nickel layer is formed as an intermediate layer and a nickel-phosphorus alloy layer is formed as an upper layer at the inner surface, and an iron-nickel diffusion layer is formed as a lower layer and a nickel layer is formed as an upper layer at the outer surface thereof. The diffusion layer of the nickel-phosphorus alloy previously contains $Ni_3P$. Further, the nickel-phosphorus alloy has a phosphorus content preferably within a range from 1 to 12% by weight.

A battery case according to an embodiment is characterized in that a diffusion layer of a nickel-cobalt-phosphorus alloy is formed at the inner surface.

A battery case according to an embodiment is characterized in that an iron-nickel diffusion layer is formed as a lower layer and a diffusion layer of a nickel-cobalt-phosphorus alloy is formed as an upper layer at the inner surface, and an iron-nickel diffusion layer is formed as a lower layer and a nickel layer is formed as an upper layer at a surface on the outer side.

A battery case according to an embodiment is characterized in that an iron-nickel diffusion layer is formed as a lower layer, a nickel layer is formed as an intermediate layer and a diffusion layer of nickel-cobalt-phosphorus alloy is formed as an upper layer at the inner surface, and an iron-nickel diffusion layer is formed as a lower layer and a nickel layer is formed as an upper layer at a surface of the outer side. The nickel-cobalt-phosphorus alloy preferably has a cobalt content within a range of from 5 to 30% by weight, and a phosphorus content within a range of from 1 to 12% by weight.

A battery case according to an embodiment is characterized in that it is obtained by a draw forming method, DI forming method or DTR forming method.

A battery case according to an embodiment is characterized by using a battery case according to any one of the embodiments previously described and filling a positive electrode active substance and a negative electrode active substance to the inside of the battery case.

BEST MODE FOR PRACTICING THE INVENTION

Surface treated steel sheets according to the present invention are to be described.
(Steel Sheet)

As a raw material for plated sheet, low carbon aluminum killed steel is preferably used usually. Further, non-aging ultra low carbon steel with addition of niobium, boron or titanium is also used. Usually, steel hoops applied with cold rolling and then electrolytic cleaning, annealing and temper rolling are used as the starting sheet.
(Nickel Plating)

Non-bright nickel plating was conducted by using the following sulfate bath. The plating thickness at the surface on the inner side of the case is preferably within a range from 0.5 to 3 μm. In a case where it is less than 0.5 μm, iron leaching increases to worsen the battery performance. Further, it may exceed 3 μm but this is excessively thick and not economical. It is preferably within a range from 0.2 to 3 μm on the outer side. In a case where it is less than 0.2 μm, corrosion resistance is poor and rust tends to occur. Further, it may exceed 3 μm but it is excessively thick and uneconomical.
Bath Composition:

| | |
|---|---|
| Nickel sulfate ($NiSO_4 \cdot 6H_2O$) | 300 g/L |
| Nickel chloride ($NiCl_2 \cdot 6H_2O$) | 45 g/L |
| Boric acid ($H_3BO_3$) | 30 g/L |

Bath pH: 4 (adjust with sulfuric acid)
Stirring: air stirring
Bath temperature: 60° C.
Anode: S pellets (trade name of products manufactured by INCO Co., spherical) charged in a titanium basket and covered with a polypropylene bag were used.

Further, the following plating bath is used for the semi-bright nickel plating. The semi-bright nickel plating may be conducted instead of the first non-bright nickel plating.
(Semi-Bright Nickel Plating)

Semi-bright nickel plating was conducted by properly adding an unsaturated alcohol polyoxyethylene adduct and an unsaturated carboxylic acid formaldehyde as a semi-brightening agent to the nickel sulfate bath. The range for the plating thickness may be identical with that in the case of the non-bright nickel plating.
Bath Composition:

| | |
|---|---|
| Nickel sulfate ($NiSO4 \cdot 6H2O$) | 300 g/L |
| Nickel chloride ($NiCl2 \cdot 6H2O$) | 45 g/L |
| Boric acid ($H3BO3$) | 30 g/L |
| Unsaturated alcohol polyoxyethylene adduct | 3.0 g/L |
| Unsaturated carboxylic acid formaldehyde | 3.0 g/L |

Bath pH: 4 (adjust with sulfuric acid)
Stirring: air stirring
Bath temperature: 60° C.
Anode: S pellets (trade name of products manufactured by INCO Co., spherical) charged in a titanium basket and covered with a polypropylene bag were used.
(Nickel-Phosphorus Alloy Plating)

The starting material sheet was applied with alkali electrolysis degreasing, water washing, sulfuric acid pickling (dipping) and pre-treatment after water washing, and then nickel-phosphorus alloy plating is conducted on one side of a steel sheet. Further, it maybe applied on the non-bright nickel plating or semi-bright nickel plating. The bath for the nickel-phosphorus alloy plating may be any of known plating baths such as watt bath, sulfamate bath or chloride bath in the invention.

The thickness of the nickel-phosphorus alloy plating is preferably within a range from 0.1 to 2 μm. In a case where it is less than 0.1 μm, many pinholes are present in the nickel-phosphorus alloy plating layer to increase nickel exposure on the surface of a battery can and increase formation of nickel andiron oxides which is not preferred. It may exceeds 2 μm but this is not economical.

Referring to the formation of nickel-phosphorus alloy plating, nickel-phosphorus alloy plating is conducted by adding phosphorus acid to a watt bath. In a specific example, phosphorus acid is added as $H_3PO_3$ while varying the amount within a range from 5 to 20 g/l to 250 g/l of nickel sulfate (hexa-hydrate), 45 g/l of nickel chloride and 30 g/l of boric acid to control the amount of phosphorus crystallized in the nickel layer. Preferably, the bath temperature is from 40 to 70° C. and the pH is from 1.5 to 2.5. In this case, the thickness of the plating layer is preferably from 0.1 to 2 μm.
(Nickel-Cobalt-Phosphorus Alloy Plating)

The starting material sheet is applied with alkali electrolysis degreasing, water washing, sulfuric acid pickling (dipping) and pre-treatment after water washing and then nickel-cobalt-phosphorus alloy plating is conducted on one side of a steel sheet. Further, it may be applied on the non-bright nickel plating or semi-bright nickel plating. The bath for the nickel-phosphorus alloy plating may be any of known plating baths such as watt bath, sulfamate bath and chloride bath.

The thickness of the nickel-cobalt-phosphorus alloy plating is preferably within a range from 0.1 to 2 μm. In a case where it is less than 0.1 μm, many pinholes are present in the nickel-cobalt-phosphorus alloy plating to increase nickel exposure on the surface of a battery can and increase formation of nickel and iron oxides which is not preferred. It may exceeds 2 μm but this is not economical.

Referring to the formation of nickel-cobalt-phosphorus alloy plating, nickel-cobalt-phosphorus alloy plating is conducted by adding phosphorus acid to a watt bath. Ina specific example, 1 to 40 g/l of cobalt sulfate and 5 to 20 g/l of phosphorus acid as $H_3PO_3$ are added while varying the amounts to 250 g/l of nickel sulfate (hexa-hydrate), 45 g/l of nickel chloride and 30 g/l of boric acid, to control the amount of phosphorus and cobalt crystallized in the nickel layer. Preferably, the bath temperature is from 40 to 70° C. and pH is from 1.5 to 2.5. In this case, the thickness of the plating layer is preferably from 0.1 to 2 μm.

(Diffusion Treatment)

After conducting the plating described above, a diffusion treatment by heat treatment is conducted. As the condition for the diffusion treatment, a non-oxidative atmosphere or a reducing atmosphere is preferred and it may be conducted, for example, in a non-oxidative atmosphere comprising 5% hydrogen and remaining nitrogen gas. The diffusion treatment may be conducted also by using known facilities such as a box-type annealing furnace or a continuous annealing furnace. The diffusion treatment is conducted at a temperature within a range from 300 to 800° C. A temperature within a range from 350 to 800° C. is more preferred. It may be conducted for a period of time in a range where the nickel plating layer in the lower layer is entirely converted into an iron-nickel alloy layer or the nickel plating layer remains partially. Although the reason is not apparent, it may be considered that characteristics are satisfactory in view of the formation of $Ni_3P$.

EXAMPLE

The present invention is to be described more specifically by way of examples.

Examples 1 to 8, Comparative Examples 1 to 4

A low carbon aluminum killed steel sheet of 0.25 mm thickness after cold rolling and annealing was uses as a starting sheet for plating. The steel chemical composition of the starting sheet for plating is as described below.

C: 0.04% (% means % by weight. Here and hereinafter),
Mn: 0.19%, Si: 0.01%, P: 0.012%, S: 0.009%,
Al: 0.064%, N: 0.0028%, The steel sheet described above was applied with alkali electrolysis degreasing under the following conditions.

(Alkali Electrolysis Degreasing)
Electrolysis Condition
  Bath composition: Caustic soda 30 g/l
  Current density: 5 A/dm² (anodic treatment)×10 sec
  Current density: 5 A/dm² (cathodic treatment)×10 sec
  Bath temperature: 70° C.

Subsequently, after applying sulfuric acid pickling (sulfuric acid 50 g/l, bath temperature 30° C., dipping 20 sec), non-brightness nickel plating or semi-brightness nickel plating is applied to both sides of a steel sheet, then nickel-phosphorus alloy plating or nickel-cobalt-phosphorus alloy plating was applied to a surface corresponding to the inner side of a battery case and, further, a diffusion treatment was conducted by a heat treatment under the conditions shown in Table 1 for examples. Non-bright nickel plating or semi-bright nickel plating was applied to both sides of a steel sheet, under the conditions shown in Table 1 and then nickel-phosphorus alloy plating or nickel-cobalt-phosphorus alloy plating was not applied for comparative examples. For Comparative Examples 1 to 2, a diffusion treatment was conducted by a heat treatment under the conditions shown in Table 1. Ni plating in Table 1 was conducted as non-bright nickel plating for Examples 3 to 6 and Comparative Examples 2 to 3 and semi-bright nickel plating was applied to others.

TABLE 1

Preparation conditions for examples and comparative examples, and battery characteristics

| Example or Comparative Example | | Battery case inner side | | | | Battery case outer side | | Battery characteristics | | |
|---|---|---|---|---|---|---|---|---|---|---|
| | | Ni plating | Ni—P or Ni—Co—P alloy plating | | | Ni - plating | Heat treatment condition | | | Discharge characteristic |
| | | Ni (g/m²) | Ni (g/m²) | P (%) | Co (%) | Ni (g/m²) | after Ni—P plating or Ni—Co—P plating | IR (mΩ) | SCC (A) | (min) |
| Example | 1 | 4.5 | 0.9 | 1.1 | — | 17.5 | 550° C. × 1 hr | 151 | 8.0 | 15.8 |
| | 2 | 8.9 | 2.6 | 4.2 | — | 18.2 | 400° C. × 1 min | 149 | 8.1 | 16.1 |
| | 3 | 17.5 | 4.7 | 7.8 | — | 17.5 | 450° C. × 1 min | 145 | 8.2 | 17.3 |
| | 4 | 16.8 | 8.8 | 11.9 | — | 18.3 | 600° C. × 30 sec | 148 | 8.2 | 17.0 |
| | 5 | 4.6 | 1.0 | 0.25 | 5.3 | 26.3 | 550° C. × 1 hr | 150 | 8.0 | 16.1 |
| | 6 | 9.2 | 2.5 | 1.54 | 9.8 | 27.1 | 400° C. × 1 min | 146 | 8.3 | 17.9 |
| | 7 | 17.2 | 4.6 | 0.28 | 18.8 | 9.1 | 450° C. × 1 min | 152 | 7.9 | 15.9 |
| | 8 | 16.9 | 8.6 | 5.3 | 28.5 | 9.5 | 600° C. × 30 sec | 141 | 8.6 | 18.3 |
| Comp. Example | 1 | 4.5 | — | — | — | 17.9 | 550° C. × 1 hr | 161 | 6.6 | 14.2 |
| | 2 | 8.5 | — | — | — | 26.4 | 780° C. × 4 min | 169 | 5.8 | 13.4 |
| | 3 | 7.9 | — | — | — | 17.9 | — | 159 | 6.2 | 14.3 |
| | 4 | 17.7 | — | — | — | 17.9 | — | 162 | 6.1 | 14.0 |

(Preparation of Battery Case)

In the formation of a battery case by a DI forming method, the surface treated steel sheet described above of 0.38 mm thickness was used and after cupping from a blank diameter of 41 mm diameter to 20.5 mm diameter, redraw and two step wringing were applied by a DI forming machine into a shape of 13.8 mm outer diameter, 0.20 mm of case wall thickness, and 56 mm of height. Finally, an upper portion was trimmed to prepare an LR6 type battery case with 49.3 mm height. In the DI forming method, surface treated steel sheets in Examples 1 to 3 and Comparative Example 1 and Comparative Example 4 were used.

In the preparation of a battery case by a DTR forming method, a surface treated steel sheet of 0.25 mm thickness was used and, punched into 58 mm blank diameter and an LR6 type battery case having 13.8 mm outer diameter, 0.20 mm case wall thickness and 49.3 mm height was prepared by punching into 58 mm blank diameter, several drawing and redraw forming. Surface treated steel sheets in Examples 4 to 6 and Comparative Example 2 were used in the DTR forming method.

Further, in the preparation of a battery case by a deep draw forming method, a plated steel sheet of 0.25 mm thickness was used and punched into 57 mm blank diameter, and an LR6 type battery case of 49.3 mm height was prepared by drawing for several times and by re-drawing into a shape of 13.8 mm outer diameter, 0.25 mm of case wall thickness and 49.3 mm height. In the deep draw forming method, surface treated steel sheets in Examples 7 to 8 and Comparative Example 3 were used.

(Preparation of Battery)

After preparing the battery case as described above, size AA (LR-6) alkali manganese batteries were manufactured as described below.

At first, manganese dioxide and graphite were sampled at a ratio of 10:1 by weight, to which potassium hydroxide (8 mol) was admixed to prepare a positive electrode mix. Then, the positive electrode mix was pressed under compression in a molding die to prepare a positive electrode mix pellets of a doughnut shape of a predetermined size which was press inserted into the battery case. Then, a negative electrode plate having a negative electrode collector spot welded thereto was mounted to the battery case.

Then, a separator comprising non-woven fabrics made of vinylon was inserted along the inner circumference of the pellets which were press bonded to the battery case, and a negative electrode gel comprising potassium hydroxide saturated with zinc particles and zinc oxide was inserted into the battery case. Further, an insulator gasket was attached to the negative electrode plate, inserted into the battery case and then caulked to manufacture a completed product of an alkali manganese cell.

For the batteries manufactured as described above, the battery performance was evaluated as described below. The results are shown in Table 1.

[Evaluation for Internal Resistance (IR)]

After aging the manufactured batteries at 80° C. for 3 days, the internal resistance (IR) was measured by the AC impedance method. Lower internal resistance shows better characteristics.

[Evaluation for Short-Circuit Current (SCC)]

After aging the manufactured batteries at 80° C. for 3 days, an ampere meter was connected to the battery to establish a closed circuit and the current value of the battery was measured, which was defined as a short circuit current (SCC). Larger short circuit current shows better characteristics.

[Discharge Characteristics]

After aging the manufactured batteries at 80° C. for 3 days, the battery was discharged at a constant current of 1A and the discharge time till it reached 0.9 V was measured and the discharge time was defined as discharge characteristics. Longer discharge time shows better characteristics.

INDUSTRIAL APPLICABILITY

A battery case obtained by the deep draw forming method, the DI forming method or the DTR forming method having a diffusion layer of a nickel-phosphorus alloy, or a nickel-cobalt-phosphorus alloy at the outermost surface on the inner side has better battery performance (internal resistance, short circuit current and discharge characteristics) compared with a battery case having a nickel layer or a nickel-iron layer at the surface on the inner side of existent battery cases.

The invention claimed is:

1. A battery case comprises a surface treated steel sheet, said surface treated steel comprising:
    a steel sheet having two surfaces, one of said two surfaces to be used as the inner surface of the battery case and the other of said two surfaces to be used as the outer surface of the battery case;
    a diffusion layer of a nickel-cobalt-phosphorus alloy having a thickness in the range of 0.1 to 2 μm and formed as an uppermost layer at said one of said two surfaces to be used as the inner surface of the battery case;
    an iron-nickel diffusion layer between said diffusion layer of a nickel-cobalt-phosphorus alloy and said steel sheet;
    a nickel layer having a thickness in the range of 0.2 to 3 μm and formed as an upper layer at said one of said two surfaces to be used as the outer surface of the battery case; and
    an iron-nickel diffusion layer between said nickel layer and said steel sheet.

2. The battery case comprising a surface treated steel sheet according to claim 1, further comprising a nickel layer formed as an intermediate layer between said diffusion layer of a nickel-cobalt-phosphorus alloy and said iron-nickel diffusion layer.

3. The battery case comprising a surface treated steel sheet according to claim 1, wherein in the diffusion layer of a nickel-cobalt-phosphorus alloy, the cobalt content is within a range from 5 to 30% by weight and the phosphorus content is within a range from 1 to 12% by weight in the nickel-cobalt-phosphorus alloy.

* * * * *